United States Patent Office 2,993,904
Patented July 25, 1961

2,993,904
PREPARATION OF 6-METHYLNICOTINIC ACID
John E. Mahan, Bartlesville, and Ralph P. Williams, Dewey, Okla., assignors to Phillips Petroleum Company, a corporation of Delaware
No Drawing. Filed Feb. 6, 1957, Ser. No. 638,479
6 Claims. (Cl. 260—295.5)

This invention relates to a process for the preparation of 6-methylnicotinic acid by the oxidation of a 2-methyl-5-alkylpyridine with nitric acid.

It is old to oxidize dialkyl pyridine with nitric acid to various products, but the production of 6-methylnicotinic acid by such a process does not appear to be disclosed in the prior art. We have now discovered a method for the selective oxidation of the 2-methyl-5-alkylpyridines to 6-methylnicotinic acid. The pyridines which we oxidize are those which contain a methyl group in the 2-position and an alkyl group of 2 to 8 carbon atoms in the 5-position. Such pyridines are typified by 2-methyl-5-ethylpyridine, 2-methyl-5-propylpyridine, 2-methyl-5-isopropylpyridine, 2-methyl-5-tert-butylpyridine, 2-methyl-5-hexylpyridine, and 2-methyl-5-octylpyridine.

In accordance with our process, a pyridine as specified above, such as 2-methyl-5-ethylpyridine, is selectively oxidized to 6-methylnicotinic acid by introducing the pyridine and nitric acid into a pressure reaction vessel and maintaining the operating conditions as follows. The nitric acid employed has an initial strength of 70 to 100 weight percent $HNO_3$ and is charged to the reactor in such quantities that the mol ratio of $HNO_3$ to pyridine in the charge is in the range of 6 to 15. The reaction temperature is maintained in the range of 250 to 325° F. with reaction pressures high enough to maintain a liquid phase reaction, generally 30 to 650 p.s.i.g. The pressure can be maintained with an inert gas such as nitrogen during the initial heating. Thereafter, some gaseous products of reaction also contribute to the pressure. The reaction is then continued for a period of 10 to 60 minutes depending on the reaction temperature. For the lower reaction temperatures, the longer reaction times are required in order to obtain the highest yield of product. When operating in this manner, high ultimate yields of 6-methylnicotinic acid are realized and any unreacted pyridine can be recycled for additional conversion to the desired end product.

It is an object of the present invention to oxidize selectively a 2-methyl-5-alkylpyridine to high yields of 6-methylnicotinic acid. Other objects as well as advantages of the invention are apparent from the accompanying disclosure.

The products are separated in any manner known to the art. One applicable procedure is the precipitation of the copper salts of the product and subsequent recovery of the free acids. This particular method of separation of the products is herein discussed as an aid to those practicing this invention but is not intended to set any limits beyond those operating conditions hereinafter discussed.

This procedure involves separation of part of any 2,5-pyridine-dicarboxylic acid formed, separation of unreacted pyridine, separation of the rest of the 2,5-pyridine dicarboxylic acid, and finally separation of the 6-methylnicotinic acid. The reactor effluent is first adjusted to a pH of about 2 by the addition of an alkaline material. This causes most of the 2,5-pyridine dicarboxylic acid to precipitate and it can be removed by filtration. The solution is then made strongly alkaline, pH about 10, in order to convert the unreacted pyridine, which is initially present as the acid salt, to the free base which can be extracted with a solvent such as ether. After adjustment of the water layer from this extraction to a pH of about 2, additional 2,5-pyridine dicarboxylic acid is recovered as the copper salt precipitate by the addition of a water soluble salt of copper. The filtrate is generally made alkaline to a pH of about 10 in order to remove any excess copper ion as cupric oxide. The filtrate from this step is then adjusted to a pH of about 6 and the addition of copper ions will precipitate copper 6-methylnicotinate. The free acid is then obtained by methods known to the art.

Preferred oxidation conditions are an acid concentration of 80 to 100 weight percent, temperatures of 250 to 315° F., and times within the range from 15 to 45 minutes. The oxidation is effected in the absence of any added catalyst.

EXAMPLE I

Forty grams of 2-methyl-5-ethylpyridine was mixed with 239 grams of 100 percent nitric acid and 275.8 grams of this mixture was charged to the reactor of Example II. The reaction time was 32.75 minutes with a reaction temperature of 260 to 280° F. and a reaction pressure of about 309 p.s.i.g. The reaction temperature was as high as 300° F. at the start but it soon dropped and was in the range of 260 to 280° F. for about 27 minutes.

The reaction products were separated in a manner similar to Example II except the reactor rinse was added to the reactor effluent without concentration of the rinse and before refluxing the reactor effluent. No 2,5-pyridine dicarboxylic acid was precipitated at a pH of 1.7 with or without cupric sulfate. The recovered crude 6-methylnicotinic acid weighed 15.01 grams and represented an ultimate yield of crude acid of 83.5 weight percent based on pyridine reacted. The conversion of pyridine to all products was 41.2 weight percent.

EXAMPLE II

Fifty grams of 2-methyl-5-ethylpyridine was mixed with 331.5 grams of 90 percent nitric acid and 379.9 grams of this mixture was charged into a jacketed reactor which was a 1½ inch inside diameter, 26 inches long, stainless steel pipe. The reactor was heated by boiling water (under pressure) in the jacket. Electrical heaters wound about the jacket served to heat the water. The reactor was pressured to about 150 p.s.i.g. with nitrogen and the reaction mixture was heated and maintained at 350 to 360° F. for 30 minutes. The reaction pressure varied between 600 and 625 p.s.i.g. When the pressure reached 625 p.s.i.g. it was bled down by hand to 600 p.s.i.g.

At the end of this reaction time, the reactor was cooled, the gaseous products were vented and 291.7 grams of material was removed from the reactor. The reactor was rinsed with 200 cc. of water and this rinse was concentrated by evaporation to about 100 cc. The reactor effluent was charged to a glass column, heated to about 95° C. under the vacuum of a water aspirator, and refluxed for removal of nitrogen oxides and other gases. The concentrated rinse above was added to the oxidation product after the reflux was completed and a 7.5 cc. sample was removed for analysis from the total 357.0 grams of material.

The pH of the product was then brought to a pH of 1.7 by the addition of a 40 percent sodium hydroxide solution and the sample stood one hour in a wet ice bath. Most of the 2,5-pyridine dicarboxylic acid formed in the oxidation was thereby precipitated, washed with 200 cc. of cold water and dried at 110° C. There was obtained 31.67 grams of free 2,5-pyridine carboxylic acid which was indicated to be 96.7 weight percent pure by titration with 0.1 N sodium hydroxide.

Additional 40 percent sodium hydroxide was added to make the above filtrate alkaline at a pH of about 10–11. This material was then extracted four times with 100 cc.

portions of ether in order to remove the unreacted pyridine. The extract was dried over magnesium sulfate, filtered, and the ether was evaporated. There was recovered 1.13 grams of pyridine. To the extracted, water layer portion of the oxidation product there was added sufficient 70 percent nitric acid to give a pH of about 1.7. The solution was heated to boiling and 20 grams of cupric sulfate ($CuSO_4 \cdot 5H_2O$) in 40 cc. of water was added. The solution was boiled 30 minutes, cooled, and filtered. The 12.2 grams of copper salt of 2,5-pyridine carboxylic acid obtained was suspended in 200 cc. of water, made alkaline with 40 percent sodium hydroxide and boiled 20 minutes. Some activated charcoal was added and the solution was cooled and filtered. The pH of the filtrate was brought to about 1.7 with 50 percent sulfuric acid and the sample stood overnight in the refrigerator. The precipitate of 2,5-pyridine dicarboxylic acid was washed with cold water and dried with a resultant yield of 4.4 grams.

The filtrate from the copper salt was now made alkaline (pH 10–11), boiled about 30 minutes, and filtered to remove any excess copper as cupric oxide. The pH was then adjusted to about 6, and sufficient 33 weight percent aqueous cupric sulfate was added to precipitate all the 6-methylnicotinic acid. The solution was boiled 20 minutes, filtered, and the precipitate was dried at 110° C. with a resultant yield of 18.4 grams of the copper salt of 6-methylnicotinic acid. The salt was boiled with water to remove any inorganic water soluble salts and filtered. The salt was then suspended in water and, while refluxing with stirring, hydrogen sulfide was bubbled through the liquid for about 8 hours. The mixture was then filtered and the filtrate was boiled with activated charcoal. After filtering once more, the filtrate was evaporated to dryness and 9.5 grams of 6-methylnicotinic acid was recovered. The acid was recrystallized from isopropyl alcohol to give 98.5 weight percent pure acid with a melting point of 208 to 210° C. The ultimate yield of crude acid was 17.8 percent with a pyridine conversion to all products of about 98 weight percent.

EXAMPLE III

Forty grams of 2-methyl-5-ethylpyridine was mixed with 341.8 grams of 70 percent nitric acid and 380.4 grams of this mixture was charged to the reactor of Example II. The reaction time was 232 minutes with a reaction temperature of 300 to 311° F. and a reaction pressure of 200 to 465 p.s.i.g. The pressure varied but was within 400 to 465 p.s.i.g. for about 90 percent of the reaction time.

The reaction products were separated in a manner similar to Example II. The yield of 2,5-pyridine dicarboxylic acid was 52.0 weight percent and the yield of crude 6-methylnicotinic acid was 26.3 weight percent based on the pyridine reacted. Approximately 96.8 weight percent of pyridine was converted to oxidation products.

EXAMPLE IV

Forty grams of 2-methyl-5-ethylpyridine was mixed with 342.0 grams of 70 percent nitric acid and 381.5 grams of this mixture was charged to the reactor of Example II. The reaction time was 29.5 minutes with a reaction temperature of 330 to 338° F. and a reaction pressure of 250 to 475 p.s.i.g. No pressure was bled down.

The reactor effluent was treated as in Example II except that the rinse was concentrated to about 50 cc. The free 2,5-pyridine dicarboxylic acid recovered by the first pH adjustment weighed 13.89 grams and was about 95.5 percent pure. The filtrate was made strongly alkaline with 40 percent sodium hydroxide and distilled under atmospheric pressure until about 250 cc. of distillate was obtained. This distillate contained 0.985 gram of pyridine as determined by titration with 0.1 N hydrochloric acid.

The residue from the distillation was treated with cupric sulfate in the manner discussed previously and 2.99 grams of 2,5-pyridine carboxylic acid was recovered. Further treatment as before discussed resulted in a recovery of 15.78 grams of 6-methylnicotinic acid which had a melting point of 208 to 211° C. This represents an ultimate yield of crude 6-methylnicotinic acid of 36.8 weight percent based on pyridine converted and about 97.5 weight percent of pyridine was oxidized.

EXAMPLE V

Forty grams of 2-methyl-5-ethylpyridine was mixed with 341.0 grams of 70 percent nitric acid and 380 grams of this mixture was charged to the reactor. The reaction time was about 30 minutes with a reaction temperature of 300 to 312° F. and a reaction pressure of 190 to 410 p.s.i.g. There was no pressure bled off during the reaction.

The reaction products were separated in a manner similar to Example II. The yield of 2,5-pyridine dicarboxylic acid was 16.9 weight percent and the yield of crude 6-methylnicotinic acid was 76.0 weight percent based on the pyridine reacted. The 6-methylnicotinic acid which was recrystallized from isopropyl alcohol melted at 209 to 210° C. Approximately 57.1 weight percent of the pyridine was oxidized.

EXAMPLE VI

Forty grams of 2-methyl-5-ethylpyridine was mixed with 341.3 grams of 70 percent nitric acid and 379.7 grams of this mixture was charged to the reactor of Example II. The reaction time was about 30 minutes with a reaction temperature of 300 to 313° F. and a reaction pressure of 200 to 400 p.s.i.g. No pressure was bled down during the reaction.

The reaction products were separated in a manner similar to Example I but no 2,5-pyridine dicarboxylic acid was obtained in the first phase of the separation process. The final yield of 2,5-pyridine dicarboxylic acid was 19.3 weight percent and the yield of crude 6-methylnicotinic acid was 60 weight percent based on the pyridine reacted. The conversion of pyridine was 63.3 weight percent.

The data from these six examples are tabulated in Table I so that the advantages of the operating conditions previously mentioned can be seen more easily.

*Table I*

| Example | I | II | III | IV | V | VI |
| --- | --- | --- | --- | --- | --- | --- |
| $HNO_3$ Concentration, Wt. Percent | 100 | 90 | 70 | 70 | 70 | 70 |
| Temperature, °F | 260–280 | 350–360 | 300–311 | 330–338 | 300–312 | 300–313 |
| Pressure, p.s.i.g | 300 | 600–625 | 400–465 | 250–475 | 190–410 | 200–400 |
| Time, minutes | 32.8 | 30 | 232 | 29.5 | 30 | 30 |
| MEP Conv., Wt. Percent | 41.2 | 98 | 96.8 | 97.5 | 57.1 | 63.3 |
| 2,5-pyridine dicarboxylic acid yield, wt. percent | 0 | 53.6 | 52.0 | 31.5 | 16.9 | 19.3 |
| 6-methylnicotinic acid yield, wt. percent | 83.5 | 17.8 | 26.3 | 36.8 | 76 | 60 |

*Note.*—For all runs $\frac{\text{Moles } HNO_3}{\text{Moles MEP}} = 11.5/1$

EXAMPLES VII–XX

The following data summarize results with the same procedures as in Example II, except for the conditions, which are given below in Table II.

Table II
6-METHYLNICOTINIC ACID FROM 2-METHYL-5-ETHYLPYRIDINE

| Example | Acid Conc., Percent | Mol Ratio, HNO₃/MEP | Temp., °F. | Time, minutes | Pressure,[1] p.s.i.g. | MEP Conv., Percent | 6-methylnicotinic acid Yield, mol percent | 2,5-pyridine dicarboxylic acid Yield, mol percent |
|---|---|---|---|---|---|---|---|---|
| VII | 80 | 11.5:1 | 290–300 | 30 | 350 | 53.0 | 70.9 | 12.6 |
| VIII | 90 | 11.5:1 | 295–305 | 30 | 310 | 47.1 | 77.0 | 5.9 |
| IX | 70 | 11.5:1 | 300–305 | 60 | 400 | 78.1 | 61.7 | 20.2 |
| X | 70 | 11.5:1 | 300–310 | 120 | 505 | 89.5 | 51.2 | 28.8 |
| XI | 70 | 11.5:1 | 300–310 | 30 | 400 | 60.4 | 67.0 | 19.2 |
| XII | 70 | 11.5:1 | 300–318 | 30 | 625 | 63.4 | 60.0 | 19.3 |
| XIII | 70 | 11.5:1 | 330–338 | 30 | 475 | 97.5 | 36.8 | 30.7 |
| XIV | 70 | 11.5:1 | 370–390 | 30 | 675 | 97.5 | 0 | 47.2 |
| XV | 50 | 11.5:1 | 363–375 | 30 | 675 | 96.9 | 0 | 66.0 |
| XVI | 60 | 11.5:1 | 275–283 | 900 | 415 | 97.5 | 0 | 70.3 |
| XVII | 60 | 11.5:1 | 330–337 | 240 | 650 | 97.5 | 0 | 46.8 |
| XVIII | 60 | 11.5:1 | 299–305 | 420 | 670 | 97.5 | 0 | 69.3 |
| XIX | 60 | 4:1 | 345–420 | 30 | 625 | 58.1 | 0 | [2] 16.8 |
| XX | 60 | 6:1 | 342–384 | 30 | 625 | 87.9 | 0 | [3] 25.8 |

[1] Pressures recorded are maximum values.
[2] Also a yield of 34.1% of nicotinic acid was obtained.
[3] Also a yield of 32.8% of nicotinic acid was obtained.

Yields are ultimate, based on MEP consumed.

Examples I, V, VI, VII, VIII, IX, XI, and XII illustrate the higher yields of 6-methylnicotinic acid obtainable when operating according to the invention, while Examples II, III, IV, X, and XIII to XX show the much lower ultimate yields obtainable operating outside the ranges of the invention.

From the foregoing, it will be apparent to those skilled in the art that variations and modifications of the invention can be made from a study of the foregoing disclosure. Such variations and modifications are believed to be clearly within the spirit and scope of the invention.

We claim:

1. A process for the preparation of high yields of 6-methylnicotinic acid which comprises the non-catalytic oxidation of a 2-methyl-5-alkylpyridine wherein said alkyl has 2 to 8 carbon atoms with nitric acid having a concentration of 70 to 100 weight percent HNO₃, wherein 6 to 15 moles of NHO₃ to each mole of said pyridine is employed, the reaction being effected in the temperature range from 250 to 325° F. for a time of from 10 to 60 minutes and a superatmospheric pressure being employed that is effective to maintain the reactants in liquid phase, and recovering the 6-methylnicotinic acid from the reaction mixture resulting.

2. A process for the preparation of high yields of 6-methylnicotinic acid which comprises the non-catalytic oxidation of a 2-methyl-5-alkylpyridine wherein said alkyl has 2 to 8 carbon atoms with nitric acid having a concentration of 80 to 100 weight percent HNO₃, wherein 6 to 15 moles of HNO₃ to each mole of said pyridine is employed, the reaction being effected in the temperature range from 250 to 315° F. for a time of from 15 to 45 minutes and a superatmospheric pressure being employed that is effective to maintain the reactants in liquid phase, and recovering the 6-methylnicotinic acid from the reaction mixture resulting.

3. A process of claim 1 wherein said pyridine is selected from the group consisting of 2-methyl-5-ethylpyridine, 2-methyl-5-propylpyridine, 2-methyl-5-isopropylpyridine, 2-methyl-5-tert-butylpyridine, 2-methyl-5-hexylpyridine, and 2-methyl-5-octylpyridine.

4. A process of claim 2 wherein said pyridine is selected from the group consisting of 2-methyl-5-ethylpyridine, 2-methyl-5-propylpyridine, 2-methyl-5-isopropylpyridine, 2-methyl-5-tert-butylpyridine, 2-methyl-5-hexylpyridine, and 2-methyl-5-octylpyridine.

5. A process of claim 3 wherein said pyridine selected is 2-methyl-5-ethylpyridine.

6. A process of claim 4 wherein said pyridine selected is 2-methyl-5-ethylpyridine.

References Cited in the file of this patent
UNITED STATES PATENTS

| | | |
|---|---|---|
| 2,524,957 | Burrows et al. | Oct. 10, 1950 |
| 2,749,350 | Nowlin | June 5, 1956 |